A. W. FLEMING.
Corn Harvester.
No. 89,396.  Patented April 27, 1869.
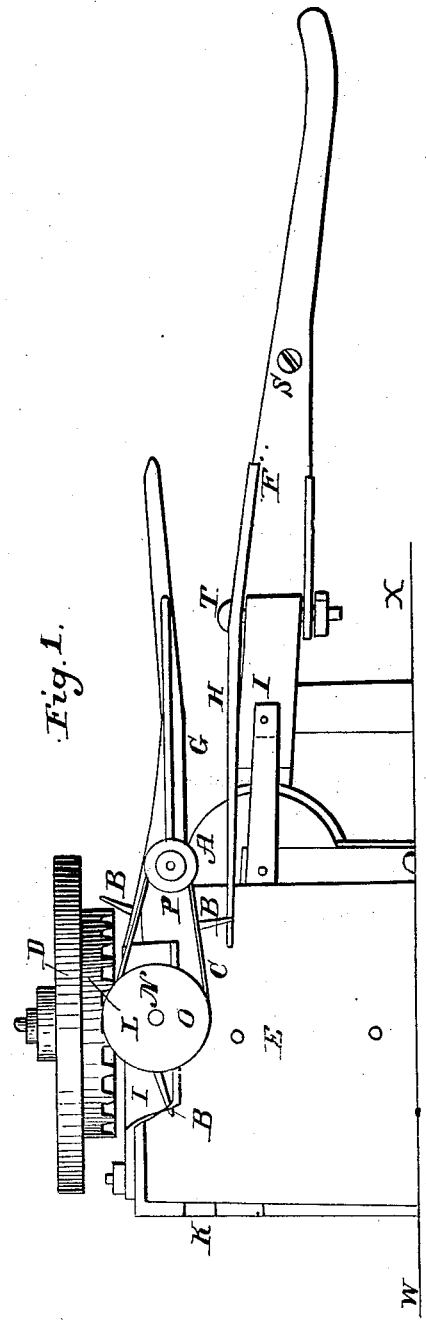
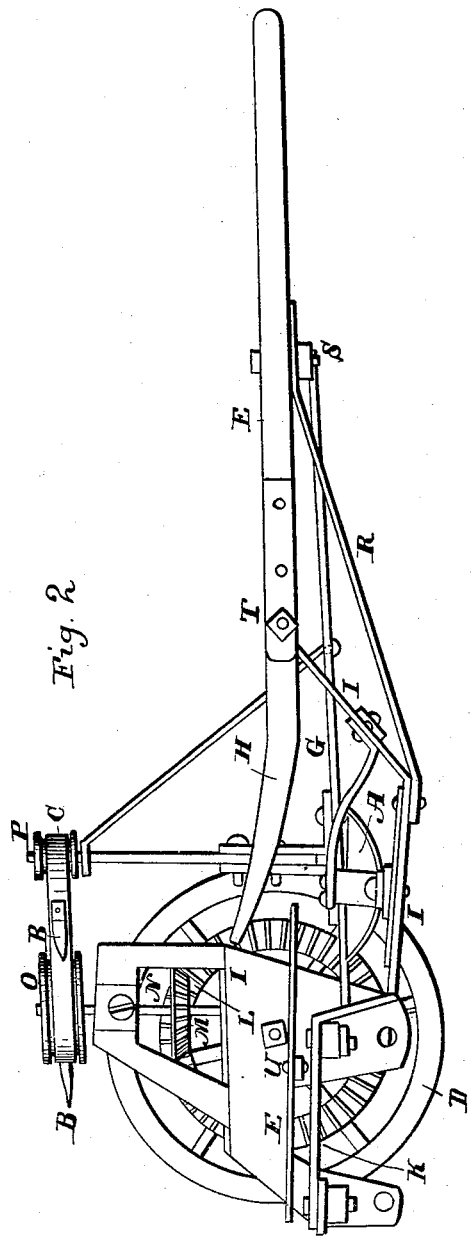
Witnesses:
Thomas Smith
David Miller
Inventor:
Alemons W. Fleming

UNITED STATES PATENT OFFICE.

ALCEMOUS W. FLEMING, OF SPRINGFIELD, ILLINOIS.

IMPROVEMENT IN CORN-HARVESTERS.

Specification forming part of Letters Patent No. 89,396, dated April 27, 1869.

*To all whom it may concern:*

Be it known that I, ALCEMOUS W. FLEMING, of the city of Springfield, in the State of Illinois, have made a new and useful invention in Corn and Cane Harvesters; and I do hereby declare the following to be a full, clear, and exact description thereof, reference being had to the accompanying drawings, and to the letters of reference marked thereon, in which—

Figure 1 is a top plan or view, showing a part of a corn and cane harvester with my improvement. Fig. 2 is a side or sectional view of the same, as seen from the line X W.

This is an improvement in harvesters for cutting up and piling cane and corn in the stalk by horse-power, and the parts are made as shown in the drawings, together with their counterparts joined at the line X W, to constitute a full machine for cutting two rows at one passage.

D is the driving-wheel. E is the platform for receiving the cut stalks. F is one of the drawing-shafts. G H are guiding rods, bars, or fenders at the sides of the cane and stalk entrance, and I is the main frame.

A dish-shaped or concave circular cutter, A, is made and placed on the frame I, with its concave side upward, at the back part of the cane and stalk entrance, between the bars G H, and set to one side, so that the stalks passing back as the machine advances will be drawn between the cutter A and the side of bar G, and, striking the slanting and upward turned sharp edge of the revolving cutter A, will be cut off thereby, and fall and be thrown, by the arms B B B on the belt C, onto the platform E, whence it can, at suitable intervals, be drawn off by the driver walking behind the machine.

The piles of cut stalks can be thrown into windrows, so as to enable the shocks to be built without carrying much distance, by making the windrows as far apart as possible, so as to set up the piles of but a few adjacent rows into one shock.

The frame I is so formed that the part bearing the cutter A, Fig. 2, is set lower than the back part, K, of the frame I, which is bent or turned upward, so as to pass over and better escape the heavy stubble of the corn or cane, to make the draft as light as possible from drag.

The drive-wheel D has bevel-gearing L on its side or inside face, and a pinion, M, on shaft N, engaging therewith, and a pulley, O, on shaft N, to drive the belt C.

The belt C passes over pulleys O and P, and the belt C has arms B B B, to engage with and carry backward the corn and cane to be cut and fall on the platform E, all of which parts form a train driven by the wheel D for that purpose.

The shaft F has a hinged joint at T, and has a brace, R, from the frame L to its middle part at S, where the brace R is fastened with a bolt to stay the shaft F.

The brace R has two or three holes near its end, so that the bolt at S can be placed in either, to adjust the shaft F to suit different heights of horses, and to adjust the height at which the cutter-frame I will stand.

The platform E is hung on a pivot at U, so as to turn downward at the back part, to assist in unloading or drawing the cut stalks off.

A like and corresponding part to that shown is united therewith at the line X W, to form a full machine, to cut two rows at one passage, and to be drawn by one horse, or two in single file.

The machine can be set at different heights by lowering or raising the axle and other parts in a suitable way, by means not distinctly noticed herein.

What I claim is—

The shaft F, with its hinged joint T, in combination with the brace R, frame I, and the adjusting-bolt S, as and for the purposes specified.

ALCEMOUS W. FLEMING.

Witnesses:
JOHN TEIRHEN,
SAMUEL JACOB WALLACE.